US011043782B2

(12) United States Patent
Wang

(10) Patent No.: US 11,043,782 B2
(45) Date of Patent: Jun. 22, 2021

(54) ADJUSTABLE COAXIAL CABLE COMPRESSION TOOL

(71) Applicant: EZCONN CORPORATION, Taipei (TW)

(72) Inventor: Cheng Hui Wang, Taipei (TW)

(73) Assignee: EZconn Corporation, Taipei (TW)

( * ) Notice: Subject to any disclaimer, the term of this patent is extended or adjusted under 35 U.S.C. 154(b) by 215 days.

(21) Appl. No.: 16/142,129

(22) Filed: Sep. 26, 2018

(65) Prior Publication Data

US 2019/0097373 A1 Mar. 28, 2019

(30) Foreign Application Priority Data

Sep. 26, 2017 (TW) ................................ 106214271

(51) Int. Cl.
*B23P 19/00* (2006.01)
*H01R 43/042* (2006.01)
*H01R 9/05* (2006.01)

(52) U.S. Cl.
CPC ....... *H01R 43/0425* (2013.01); *H01R 9/0518* (2013.01); *Y10T 29/53226* (2015.01)

(58) Field of Classification Search
CPC ......... Y10T 29/53226; Y10T 29/53235; Y10T 29/53257; Y10T 29/5327; Y10T 29/5193; Y10T 29/53209; Y10T 29/53213; Y10T 29/53283; Y10T 29/53222; Y10T 29/49123; Y10T 29/49174; Y10T 29/49181; H01R 9/05; H01R 43/042
USPC ......... 29/751, 747, 748, 750, 753, 758–760, 29/764, 816, 869
See application file for complete search history.

(56) References Cited

U.S. PATENT DOCUMENTS 10,749,306 B2 * 8/2020 Wang .................. H01R 43/015

* cited by examiner

*Primary Examiner* — Thiem D Phan

(57) ABSTRACT

An adjustable coaxial cable compression tool, terminating a coaxial cable connector onto a coaxial cable end, comprising a plunger, a body, a fixed guideway plate, a first moveable guideway plate, a second moveable guideway plate, and a die block is provided. The plunger comprises a first plunger head and a second plunger head, both having different shapes conforming to different types of coaxial cable connectors and are interchangeable. The body has a body receiving end, wherein the plunger is slidable therein. The fixed, first moveable and second moveable guideway plates have fixed, first and second guideways, each having different diameters, respectively. The die block comprises first and second die halves. The plunger is axially advanced to force the coaxial cable connector onto the coaxial cable end, radially contracting the coaxial cable connector into compression engagement with the coaxial cable end.

11 Claims, 7 Drawing Sheets

ADJUSTABLE COAXIAL CABLE COMPRESSION TOOL

RELATED APPLICATIONS

The present application claims priority to Taiwan application no. 106214271, filed on Sep. 26, 2017, of which is hereby incorporated by reference in its entirety.

BACKGROUND OF THE INVENTION

Field of the Invention

The invention relates to compression tools, and more particularly, to adjustable coaxial cable compression tools.

Description of the Related Art

Coaxial cables connectors, for example, F-type connectors for RG-6 and RG-6 Quad cables and BNC connectors, are used for CATV, satellite and video applications etc. Generally, twist-on coaxial cable connectors are convenient, but, can be dislodged easily, while compressed coaxial cable connectors are durable. A compression tool can be used to install a coaxial cable connector onto the end of a coaxial cable. However, depending upon the compression tool used, versatility may be non-existent or limited, when compressing coaxial cable connectors of different types, sizes, diameters and lengths. For compression tools with limited versatility and/or a larger size and/or multiple parts and/or multi-step adjustments, operation thereof can be a hindrance. Additionally, versatility, functionability, easability and durability of use are challenges.

There is demand for adjustable coaxial cable compression tools to solve the aforementioned problem.

BRIEF SUMMARY OF THE INVENTION

Adjustable coaxial cable compression tools are provided.

In an embodiment, an adjustable coaxial cable compression tool, terminating a coaxial cable connector onto a coaxial cable end, comprising a plunger, a body, and a die block is provided. The body has a body receiving end, wherein the plunger is slidable therein. The die block comprises a first die half having a first die flange and a second die half having a second pivot opening and a second die flange. The first and second die halves are complementary and rotatably attached via the first die flange and second die pivot opening. The die block is rotatably attached to a first side of a die support recess of the body via the second die flange, whereby the die block rotatably fits flush with the die support recess. In the embodiment, the plunger is axially advanced to force the coaxial cable connector onto the coaxial cable end, radially contracting the coaxial cable connector into compression engagement with the coaxial cable end, both secured within the die block.

In an embodiment, the adjustable coaxial cable compression tool further comprises a lever arm pivotably mounted to the body and pivotably attached to the plunger. In the embodiment, the lever arm drives the plunger to axially advance and retract relative to the body, whereby the lever arm rotatably fits parallel with the body.

In an embodiment, the adjustable coaxial cable compression tool further comprises a second moveable guideway plate, rotatably attached to the body on a second side of the die support recess of the body, opposite the first side of the die support recess of the body. The second moveable guideway plate rotatably fits flush with the die support recess. The flush rotations of the second moveable guideway plate and die block are opposite rotational directions, respectively.

In an alternative embodiment, the adjustable coaxial cable compression tool further comprises a first moveable guideway plate, in addition to the second moveable guideway plate. The first moveable guideway plate is rotatably attached to the body on the first side of the die support recess of the body, whereby the first moveable guideway plate rotatably fits flush with the die support recess. The flush rotations of the die block and first moveable guideway plate are the same rotational directions, respectively. The flush rotations of the second moveable guideway plate and first moveable guideway plate are opposite rotational directions, respectively.

In another alternative embodiment, the adjustable coaxial cable compression tool further comprises a fixed guideway plate, rotatably attached to the body on the first side of the die support recess and fixed to the body, a second moveable guideway plate, rotatably attached to the body on a second side of the die support recess, opposite the first side of the die support recess of the body, and a first moveable guideway plate, rotatably attached to the body on the first side of the die support recess, whereby the fixed, second moveable and first moveable guideway plates rotatably fits flush with the die support recess and the flush rotations of the die block, fixed guideway plate and first moveable guideway plate are the same rotational directions, respectively, and whereby the flush rotations of the second moveable guideway plate and first moveable guideway plate are opposite rotational directions, respectively.

In an embodiment, the adjustable coaxial cable compression tool further comprises a first plunger head having a first plunger head end, a first plunger head rod, and a first plunger head flange therebetween and a second plunger head having a second plunger head end, a second plunger head rod, and a second plunger head flange therebetween. The first plunger head and second plunger head are of different shapes conforming to different types of coaxial cable connectors and are interchangeable. In the embodiment, the second plunger head is housed in the body for terminating the coaxial cable connector onto the coaxial cable end.

In an embodiment, the plunger comprises a plunger sleeve end, a bifurcated plunger end, and a spring therebetween, surrounding the plunger. The plunger is axially slidable in a body receiving end of the body, providing spring force between the plunger sleeve end and bifurcated plunger end of the plunger.

In an embodiment, the first die half further comprises a first die cavity and the second die half further comprises a second die cavity, complementary to the first die cavity. The first die cavity and second die cavity radially contracts the coaxial cable connector into compression engagement with the coaxial cable end secured within the die block, via the plunger.

In an embodiment, the die block further comprises a die lever having a first die lever hook on one end thereof. The die lever is rotatably attached within a first die lever opening of the first die half. The second die half further comprises a second die pin in a second die receiving end, whereby the die lever is snap hooked onto the second die pin when the first die half and second die half are closed.

In an embodiment, the outer rims of the non-compression ends of the first and second die cavities comprise cavity grip grooves, respectively, gripping the coaxial cable connector for hindered movement via the plunger.

In an alternative embodiment, an adjustable coaxial cable compression tool, terminating a coaxial cable connector onto a coaxial cable end, comprising a plunger, a body, a second moveable guideway plate, and a die block is provided. The body has a body receiving end, wherein the plunger is slidable therein. The second moveable guideway plate is rotatably attached to the body on a second side of a die support recess of the body. The second moveable guideway plate rotatably fits flush with the die support recess. The die block comprises a first die half having a first die flange and a second die half having a second pivot opening and a second die flange. The first and second die halves are complementary and rotatably attached via the first die flange and second die pivot opening. The die block is rotatably attached to a first side of a die support recess of the body via the second die flange, whereby the die block rotatably fits flush with the die support recess. In the embodiment, the first side and second side are opposite sides of the die support recess, whereby the flush rotations of the second moveable guideway plate and die block are opposite rotational directions, respectively. In the embodiment, the plunger is axially advanced to force the coaxial cable connector onto the coaxial cable end, radially contracting the coaxial cable connector into compression engagement with the coaxial cable end, both secured within the die block.

In an embodiment, the adjustable coaxial cable compression tool further comprises a lever arm pivotably mounted to the body and pivotably attached to the plunger. In the embodiment, the lever arm drives the plunger to axially advance and retract relative to the body, whereby the lever arm rotatably fits parallel with the body.

In an embodiment, the adjustable coaxial cable compression tool further comprises a first moveable guideway plate, rotatably attached to the body on the first side of the die support recess of the body, whereby the first moveable guideway plate pivotably fits flush with the die support recess. The flush rotations of the first moveable guideway plate and die block are the same rotational directions, respectively. The flush rotations of the first moveable guideway plate and second moveable guideway plate are opposite rotational directions, respectively.

In an embodiment, the adjustable coaxial cable compression tool further comprises a first plunger head having a first plunger head end, a first plunger head rod, and a first plunger head flange therebetween and a second plunger head having a second plunger head end, a second plunger head rod, and a second plunger head flange therebetween. The first plunger head and second plunger head are of different shapes conforming to different types of coaxial cable connectors and are interchangeable. In the embodiment, the second plunger head is housed in the body for terminating the coaxial cable connector onto the coaxial cable end.

In an embodiment, the plunger comprises a plunger sleeve end, a bifurcated plunger end, and a spring therebetween, surrounding the plunger. The plunger is axially slidable in a body receiving end of the body, providing spring force between the plunger sleeve end and bifurcated plunger end of the plunger.

In an embodiment, the first die half further comprises a first die cavity and the second die half further comprises a second die cavity, complementary to the first die cavity. The first die cavity and second die cavity radially contracts the coaxial cable connector into compression engagement with the coaxial cable end secured within the die block, via the plunger.

In an embodiment, the die block further comprises a die lever having a first die lever hook on one end thereof. The die lever is rotatably attached within a first die lever opening of the first die half. The second die half further comprises a second die pin in a second die receiving end, whereby the die lever is snap hooked onto the second die pin when the first die half and second die half are closed.

In an embodiment, the outer rims of the non-compression ends of the first and second die cavities comprise cavity grip grooves, respectively, gripping the coaxial cable connector for hindered movement via the plunger.

These, as well as other components, steps, features, benefits, and advantages of the present application, will now made clear by reference to the following detailed description of the embodiments, the accompanying drawings, and the claims.

BRIEF DESCRIPTION OF THE DRAWINGS

The accompanying drawings, which are incorporated herein and form a part of the Detailed Description of the Invention, illustrate various embodiments of the present invention and, together with the Detailed Description of the Invention, serve to explain principles discussed below. The drawings referred to in this Brief Description of Drawings should not be understood as being drawn to scale unless specifically noted.

DETAILED DESCRIPTION OF THE INVENTION

Figure 1B:
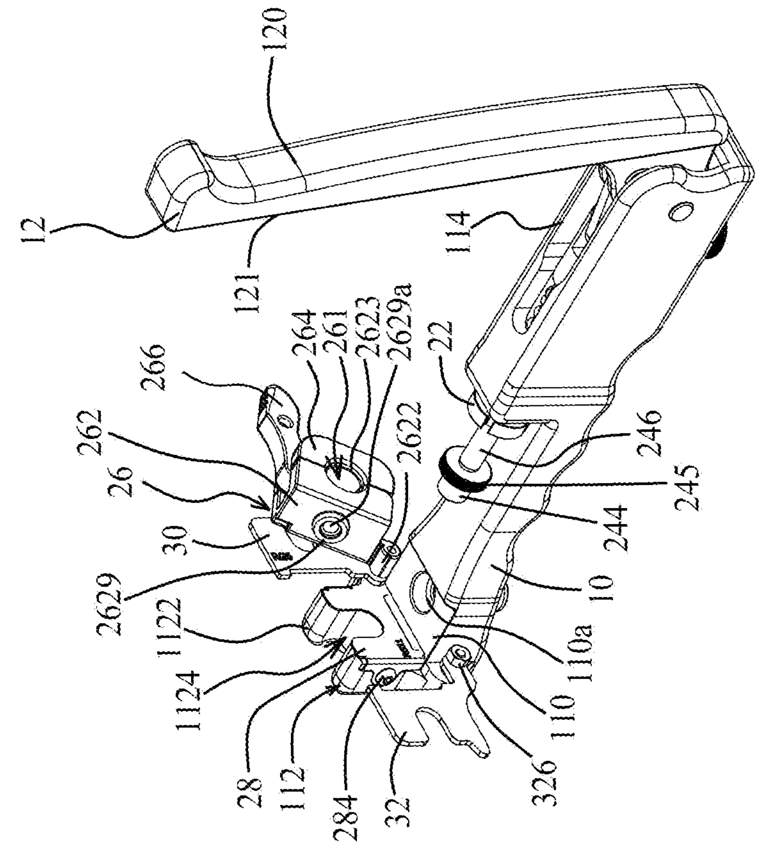
FIG. 1*b* is a perspective top side view illustrating the adjustable coaxial cable compression tool of FIG. 1*a* having retracted guideways according to various embodiments.

It is understood that the following disclosure provides many different embodiments, or examples, for implementing different features of the invention. Specific examples of devices and arrangements are described below to simplify the present disclosure. These are, of course, merely examples and are not intended to be limiting. For example, the formation of a first feature over or on a second feature in the description that follows can include embodiments in which the first and second features are formed in direct contact, and can also include embodiments in which additional features are formed between the first and second features, such that the first and second features are not in direct contact. In addition, the present disclosure can repeat reference numerals and/or letters in the various examples. This repetition is for the purpose of simplicity and clarity and does not in itself dictate a relationship between the various embodiments and/or configurations discussed. It is intended that the scope of the present technology be defined by the claims appended hereto and their equivalents.

An adjustable coaxial cable compression tool, terminating a coaxial cable connector onto a coaxial cable end, comprising a plunger, a body, a fixed guideway plate, a first moveable guideway plate, a second moveable guideway plate, and a die block is provided. The plunger comprises a first plunger head and a second plunger head, both having different shapes conforming to different types of coaxial cable connectors and are interchangeable. The body has a body receiving end, wherein the plunger is slidable therein. The fixed, first moveable and second moveable guideway plates have fixed, first and second guideways, each having different diameters, respectively. The die block comprises first and second die halves. The plunger is axially advanced to force the coaxial cable connector onto the coaxial cable end, radially contracting the coaxial cable connector into compression engagement with the coaxial cable end.

Figure 1A:
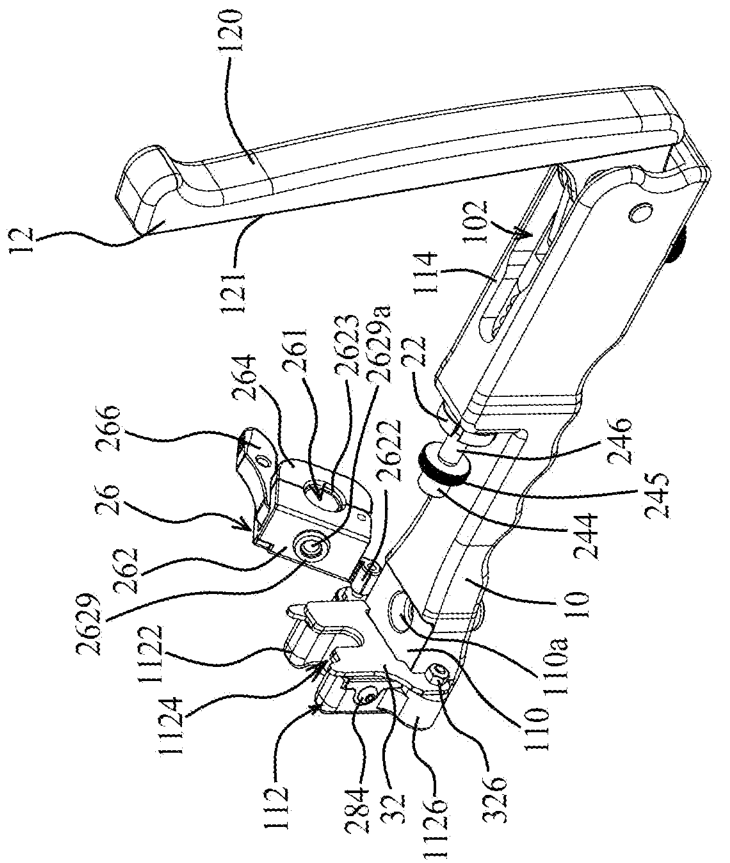
FIG. 1*a* is a perspective top side view illustrating an adjustable coaxial cable compression tool according to various embodiments.
Figure 1D:
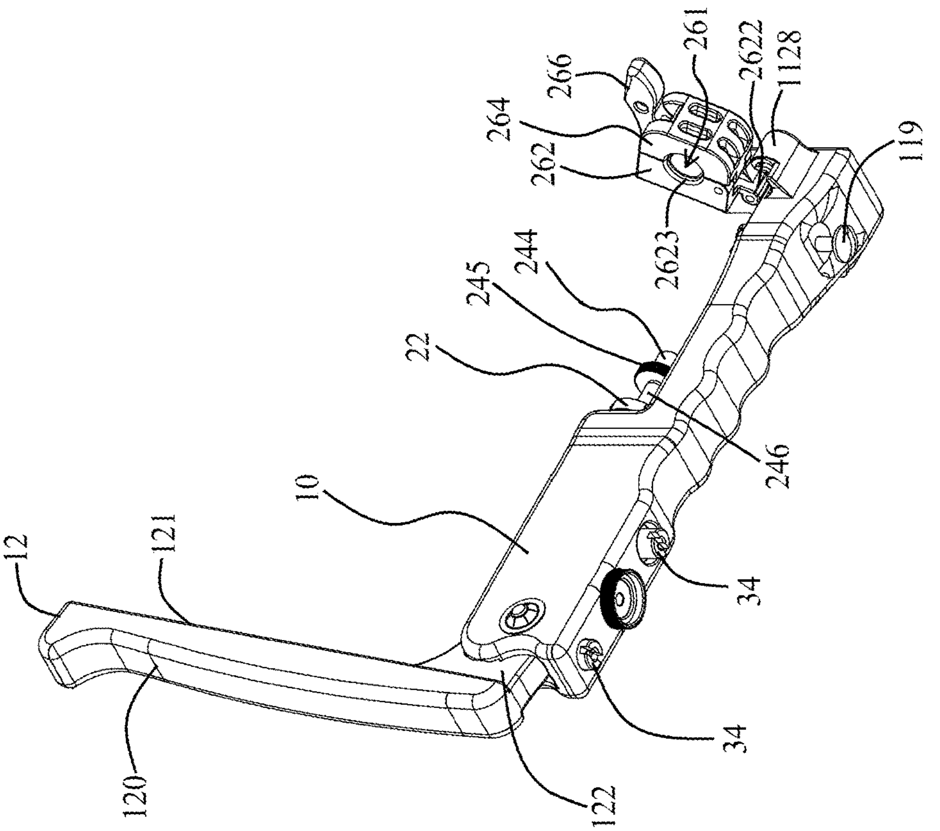
FIG. 1*d* is a perspective bottom side view illustrating the adjustable coaxial cable compression tool of FIG. 1*a* according to various embodiments.
Figure 1C:
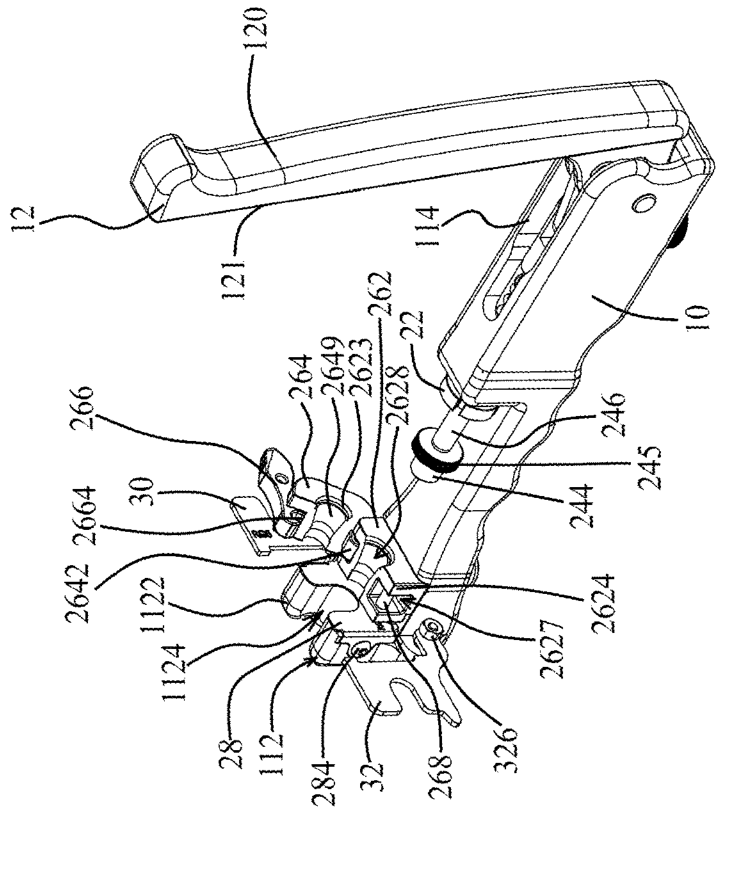
FIG. 1*c* is a perspective top side view illustrating the adjustable coaxial cable compression tool of FIG. 1*a* having retracted guideways and a partially secured die block according to various embodiments.
Figure 2A:
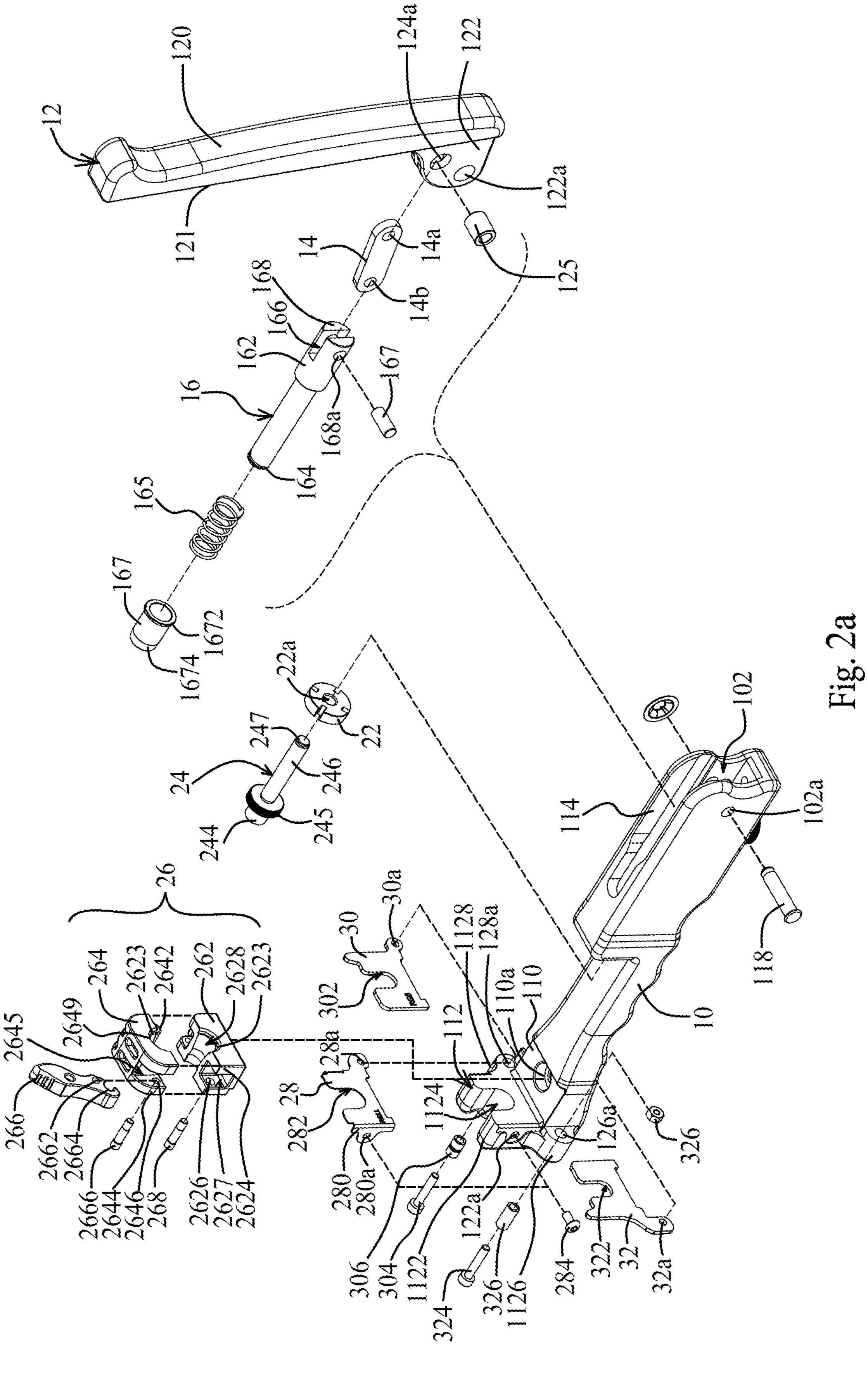
FIG. 2*a* is an exploded view illustrating an adjustable coaxial cable compression tool according to various embodiments.
Figure 2B:
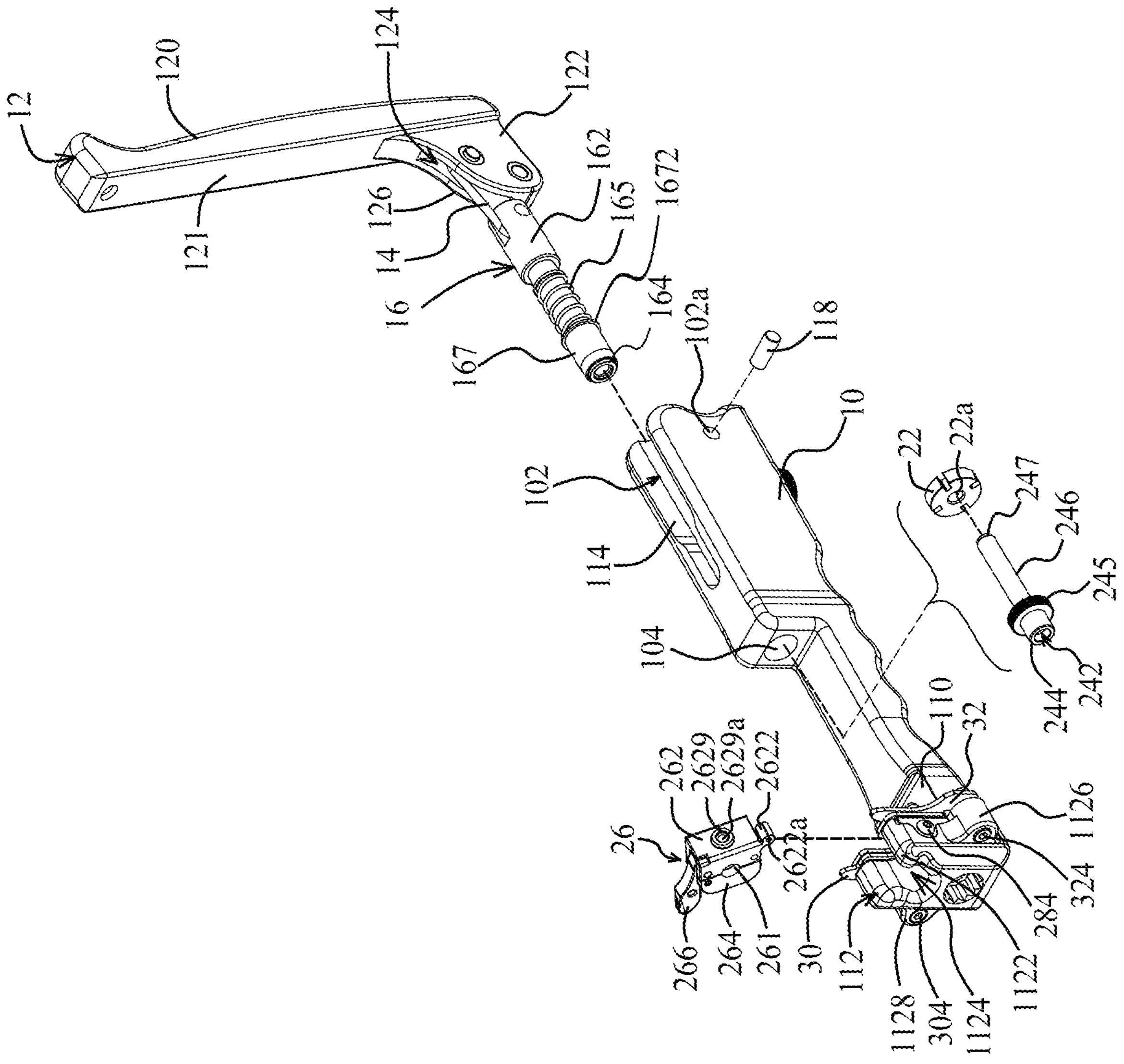
FIG. 2*b* is a partially exploded view illustrating the adjustable coaxial cable compression tool of FIG. 2*a* according to various embodiments.

FIG. 1*a* is a perspective top side view illustrating an adjustable coaxial cable compression tool according to various embodiments. FIG. 1*b* is a perspective top side view illustrating the adjustable coaxial cable compression tool of FIG. 1*a* having retracted guideways according to various embodiments. FIG. 1*c* is a perspective top side view illustrating the adjustable coaxial cable compression tool of FIG. 1*a* having retracted guideways and a partially secured die block according to various embodiments. FIG. 1*d* is a perspective bottom side view illustrating the adjustable coaxial cable compression tool of FIG. 1*a* according to various embodiments. FIG. 2*a* is an exploded view illustrating an adjustable coaxial cable compression tool according to various embodiments. FIG. 2*b* is a partially exploded view illustrating the adjustable coaxial cable compression tool of FIG. 2*a* according to various embodiments. As shown in FIGS. 1*a* to 1*d* and FIGS. 2*a* to 2*b*, in an embodiment, an adjustable coaxial cable compression tool, terminating a coaxial cable connector onto a coaxial cable end, comprising a lever arm 12, a plunger 16, a body 10, and a die block 26 is provided. The body 10 has a body receiving end 102, a body plunger core 104, a die support recess 110, and a main body guideway support 112. The body receiving end 102, axially communicates, with the body plunger core 104, wherein the plunger 16 is slidable therein. Corresponding body arm through holes 102*a* are disposed on opposing body rail side walls 114 of the body receiving end 102 at an end thereof closest to the lever arm 12 for assembly of the lever arm 12 and plunger 16 to the body 10.

In an embodiment, the lever arm 12 is pivotably mounted to the body 10 and pivotably attached to the plunger 16. In the embodiment, the lever arm 12 comprises an arm front side 121 and arm back side 120 for gripping and moving of the lever arm 12 and an arm offset 122 at a bottom end thereof. The arm offset 122 has an arm plunger opening 124 having opposing offset side walls 126. The opposing offset side walls 126 comprise arm link holes 124*a* and pivot holes 122*a* therethrough, wherein the arm link holes 124*a* are disposed near an upper side of the arm offset 122 closest to the arm front side 121 and the pivot holes 122*a* are disposed near an outer bottom side of the arm offset 122 closest to the plunger 16 and furthest away from the arm front side 121.

In an embodiment, the plunger 16 comprises a plunger sleeve end 167, a bifurcated plunger end 162, and a spring 165 therebetween, surrounding the plunger 16. The plunger sleeve end 167 has an inner threaded end 1674 on a front end thereof, furthest from the lever arm 12 and a sleeve end flange 1672 on an opposite end thereof closest to the lever arm 12. The plunger 16 has an outer threaded end 164 at a tip furthest from the lever arm 12. The bifurcated plunger end 162 is disposed on the opposite end of the outer threaded end 162, closest to the lever arm 12. The bifurcated plunger end 162 has bifurcated plunger tip ends 168 at an end thereof and plunger link holes 168*a* disposed centrally, near thereto.

In an embodiment, the adjustable coaxial cable compression tool further comprises a floating link 14 having a link plunger hole 14*a* and a link arm hole 14*a*. The floating link 14 is pivotably attached to the plunger 16 via the link plunger hole 14*b*, the plunger link hole 168*a*, and a plunger pin 167 and pivotably attached to the lever arm 12 via the link arm hole 14*a*, arm link hole 124*a*, and an arm link roll pin 125. The lever arm 12 is attached to the body receiving end 102 of the body 10 via the pivot hole 122*a*, the body arm through hole 102*a*, and a body arm roll pin 118. The plunger 16 is slidable within the body receiving end 102 and body rail side walls 114 of the body 10. The lever arm 12 drives the plunger 16 to axially advance and retract relative to the body 10, whereby the lever arm 12 rotatably fits parallel with the body 10. When advanced, the sleeve end flange 1672 prevents the plunger sleeve end 167 and abutting spring 165 from completely sliding through the body plunger core 104, but not the plunger 16.

In an embodiment, the adjustable coaxial cable compression tool further comprises a first plunger head 24 having a first plunger head end 244, a first plunger head rod 246 having a rod outer threaded end 247, and a first plunger head flange 245 therebetween, near to the first plunger head end 244, and a second plunger head having a second plunger head end, a second plunger head rod having a rod outer threaded end, and a second plunger head flange therebetween, near to the first plunger head end (not shown). The surface of the first plunger head flange 245 and second plunger head flange is coarse for ease of assembly and/or operation. The first plunger head 244 and second plunger head are of different shapes conforming to different types of coaxial cable connectors and are interchangeable. In an embodiment, the second plunger head is housed in the body 10 for terminating the coaxial cable connector onto the coaxial cable end. Both the first plunger head 244 and second plunger head further comprise a plunger head connector having head connector inner threads, respectively, disposed through centers thereof. In an embodiment, the first plunger head connector 22 is attached to the first rod outer threaded end 247 of the first plunger head rod 246 on one end of the first plunger head 24 and attached to the plunger 16 on an opposite end of the first plunger head 24 for advancement and retraction via the plunger 16 and level arm 12. In an embodiment, the first plunger head 24 is disposed on an opposing side of the body receiving end 102 of the body 10, furthest from the level arm 12 and outside of the body plunger core 104. In the embodiment, the plunger 16 is axially slidable in the body receiving end 102 of the body 10, providing spring force between the sleeve end flange 1672 of the plunger sleeve end 167 and front sidewall of the bifurcated plunger end 162 of the plunger 16.

In an embodiment, the die support recess 110 having a die fixing through hole 110*a* at a center thereof, is laterally extended, opposite the body receiving end 102, between the main body guideway support 112 and body receiving end 102. The main body guideway support 1122 comprises a main body guideway 1124 disposed in a top middle thereof. Top curved ledges of the main body guideway 1124 have main body guideway protrusions 1122 thereon for enhanced gripping. In an embodiment, on bottom sides of the main body guideway support 112, the main body guideway support 112 further comprises a second bolt receiving end 1126 having a second receiving end through hole 126*a* at a center thereof and a first bolt receiving end 1128 having a first receiving end through hole 128*a* at a center thereof, opposite the second bolt receiving end 1126. The main body guideway protrusion 1122 further comprises a plate fixing screw hole 122*a* on a second side thereof.

In an embodiment, the adjustable coaxial cable compression tool further comprises a fixed guideway plate 28 having a fixed guideway plate through hole 28*a*, a plate fixing appendage 280 having a fixing appendage through hole 280*a* and a fixed guideway 282. The fixing appendage through hole 280*a* of the plate fixing appendage 280 is assembled to be flush with the second side and the plate fixing screw hole 122*a* of the main body guideway support 112 via the fixing appendage screw 284. The fixed guideway plate 28 is also flush with the die support recess 110 of the body 10. At an opposite bottom end thereof, the fixed guideway plate 28 is assembled to a first bolt receiving end 1128 on a first bottom side of the main body guideway support 112 via a first body bolt 304, a first bolt threaded sleeve 306 and a first receiving end through hole 128*a* of the main body guideway support 112, wherein the first bolt threaded sleeve 306 is within the first receiving end through hole 128*a*. In the embodiment, the fixed guideway 282 is aligned with the main body guideway 1124, having substantially the same diameters; however the embodiments are not limited thereto. The diameter of the fixed guideway 282 can be smaller than the diameter of the main body guideway 1124.

In an embodiment, the adjustable coaxial cable compression tool further comprises a second moveable guideway plate 32 having a second guideway plate through hole 32*a* and a second guideway 322. The second moveable guideway plate 32 is rotatably attached to a second bolt receiving end 1126 on a second bottom side of the main body guideway support 112, opposite the first bottom side, via a second body bolt 324, a second bolt threaded sleeve 326, a second receiving end through hole 126*a*, and a nut 38, wherein the second bolt threaded sleeve 326 is within the second receiving end through hole 126*a*. The second moveable guideway plate 32 rotatably fits flush with the die support recess 110. The flush rotations of the second moveable guideway plate 32 and die block 26 are opposite rotational directions, respectively. In the embodiment, the second guideway 322 is aligned with the main body guideway 1124, having substantially the same diameters; however the embodiments are not limited thereto. The diameter of the second guideway 322 can be smaller than the diameter of the main body guideway 1124.

In another embodiment, the second guideway 322 is aligned with the fixed guideway 282 and the main body guideway 1124, and the diameters of the main body guideway 1124, the fixed guideway 282 and the second guideway 322 are different, as an example, and not to be limiting, with the largest being the second guideway 322 and the smallest being the main body guideway 1124.

In an alternative embodiment, the adjustable coaxial cable compression tool further comprises a first moveable guideway plate 30 having a first guideway plate through hole 30*a* and a first guideway 302. The first moveable guideway plate 30 is rotatably attached to the first bolt receiving end 1128 on the first bottom side of the main body guideway support 112, opposite the second bottom side, via the first body bolt 304, first bolt threaded sleeve 306 and a first receiving end through hole 128*a*, wherein the first bolt threaded sleeve 306 is in the first receiving end through hole 128*a*. The first moveable guideway plate 30 rotatably fits flush with the die support recess 110. The flush rotations of the die block 26 and first moveable guideway plate 30 are the same rotational directions, respectively. In the embodiment, the first guideway 302 is aligned with the main body guideway 1124, having substantially the same diameters; however the embodiments are not limited thereto. The diameter of the first guideway 302 can be smaller than the diameter of the main body guideway 1124.

In another embodiment, the flush rotations of the fixed guideway plate 28, first moveable guideway plate 30, and die block 26 are the same rotational directions, respectively. The first guideway 302 is aligned with the fixed guideway 282 and the main body guideway 1124, and the diameters of the main body guideway 1124, the fixed guideway 282 and the first guideway 302 are different, as an example, and not to be limiting, with the largest being the main body guideway 1124 and the smallest being the first guideway 302.

In a further embodiment, the flush rotations of the fixed guideway plate 28, first moveable guideway plate 30, and die block 26 are the same rotational directions, respectively, and opposite to the flush rotation of the second moveable guideway plate 32. The first guideway 302 is aligned with the second guideway 322, fixed guideway 282 and the main body guideway 1124, and the diameters of the main body guideway 1124, the fixed guideway 282, the first guideway 302, and the second guideway 322 are different, as an example, and not to be limiting, with the largest being the main body guideway 1124, second largest being the fixed guideway 282 and the smallest being the second guideway 322.

In an embodiment, the die block 26 comprises a first die half 264 having a first die roll pin 2666 and first die flange 2642 having a through hole therethrough, a second die half 262 having a second die pin 268, second pivot opening and a second die flange 2622, and a die lever 266. The first and second die halves 264, 262 are complementary and rotatably attached via the first die flange 2642 and second die pivot opening. The die block 26 is rotatably attached to a first side of the die support recess 110 of the body 10 via the second die flange 2622, whereby the die block 26 rotatably fits flush with the die support recess 110.

In an embodiment, the second die half 262 further comprises a screw hole receiving protrusion 2629 at a central bottom thereof, having a die fixing screw hole 2629*a* therein. When assembled the screw hole receiving protrusion 2629 of the second die half 262 of the die block 26, correspondingly fits within a die fixing through hole 110*a* of the die support recess 110, with the non-protruding bottom surface areas of the die block 26 being rotatably flush with the die support recess 110. A die fixing screw 119, fixes the body 10 to the second die half 262 via the die fixing through hole 110*a* and die fixing screw hole 2629*a*.

In an embodiment, the outer rims of the non-compression ends of the first and second die cavities 2649, 2628 comprise cavity grip grooves 2623, respectively, gripping the coaxial cable connector 38 for hindered movement via the plunger 16.

In an embodiment, the first die half 264 further comprises a first die cavity 2649 and the second die half 262 further comprises a second die cavity 2628, complementary to the first die cavity 2649. The first die cavity 2649 and second die cavity 2628 radially contracts the coaxial cable connector into compression engagement with the coaxial cable end secured within the die block, via the plunger 16.

In an embodiment, the die lever 266 has a first die lever hook 2664 on one end thereof and a perforated end, as an example, and not to be limiting, on an opposite end thereof. The first die half 264 comprises a first die lever opening 2645 having opposing first die side walls 2644, wherein an outer first die side wall end thereof has a first die through hole 2646 therethrough. The die lever 266 is rotatably attached within the first die lever opening 2645 of the first die half 264. The first die cavity 2649 is between the first die through hole 2646 and first die flange 2642. The second die half 262 comprises a second die receiving end 2627 having opposing second die side walls 2624, wherein an outer first die side wall end thereof has a second die through hole 2626 therethrough. The second die half 262 further comprises a second die pin 268, and a second die receiving end 2627. The second die pin 268 is slid through the second die through hole 2626 and secured, and the die lever 266 is snap hooked onto the second die pin 268 when the first die half 264 and second die half 262 are closed. The second die cavity 2628 is between the second die through hole 2626 and second die flange 2622.

In the embodiments, the plunger 16 is axially advanced to force the coaxial cable connector onto the coaxial cable end, radially contracting the coaxial cable connector into compression engagement with the coaxial cable end, both secured within the die block 26.

Figure 4B:
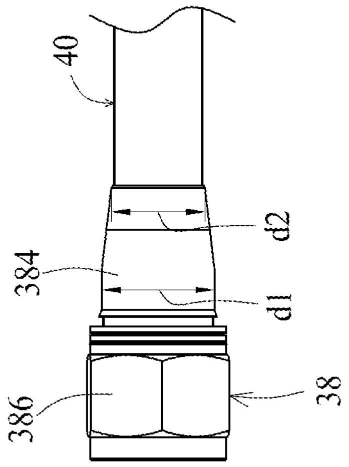
FIG. 4*b* is a perspective view illustrating the coaxial cable end and the coaxial cable connector of FIG. 4*a* in a compressed state according to various embodiments.
Figure 4A:
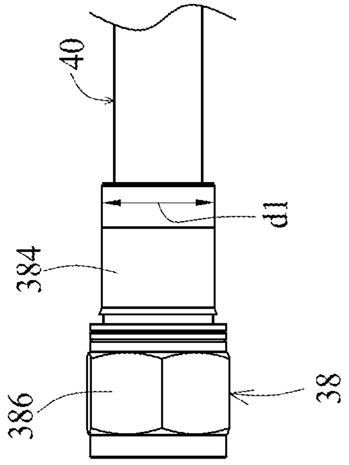
FIG. 4*a* is a perspective view illustrating a coaxial cable end and a coaxial cable connector in a non-compressed state according to various embodiments.

FIG. **4*a* is a perspective view illustrating a coaxial cable end and a coaxial cable connector in a non-compressed state according to various embodiments. FIG. 4*b* is a perspective view illustrating the coaxial cable end and the coaxial cable connector of FIG. 4*a* in a compressed state according to various embodiments. As shown in FIG. 4*a* and FIG. 4*b*, in an embodiment, the diameter of a compression end of the first and second die cavities 2649, 2628 is smaller than the diameter of a non-compression end of the first and second die cavities 2649, 2628, wherein the compression end is the end closest to the main body guideway support 112. The first and second die cavities 2649, 2628 comprise a tapered slope 261**.

In an embodiment, the adjustable coaxial cable compression tool further comprises a plurality of alternative moveable guideway plates 34 which are disposed at a bottom of the body 10. The plurality of alternative moveable guideway plates 34 is combined with a plurality of plunger heads of the plunger, to support different type, size, diameter and length coaxial cable connectors, such as F-type BNC, RCA, XLR, DFP, DVI, SCART and RF cable connectors etc.

Figure 3A:
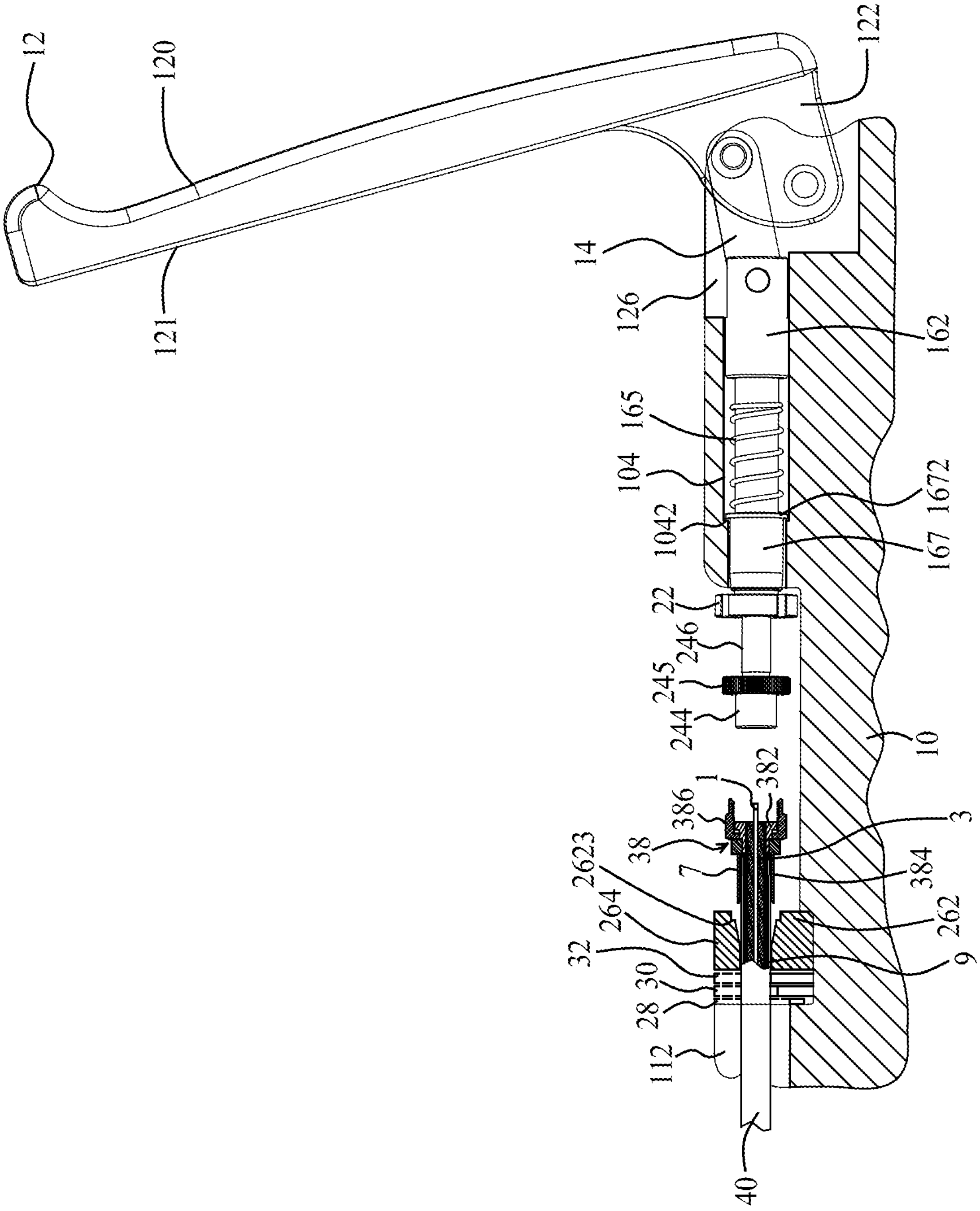
FIG. 3*a* is a cross-sectional view illustrating an adjustable coaxial cable compression tool having a coaxial cable end and a coaxial cable connector in a retracted state according to various embodiments.
Figure 3B:
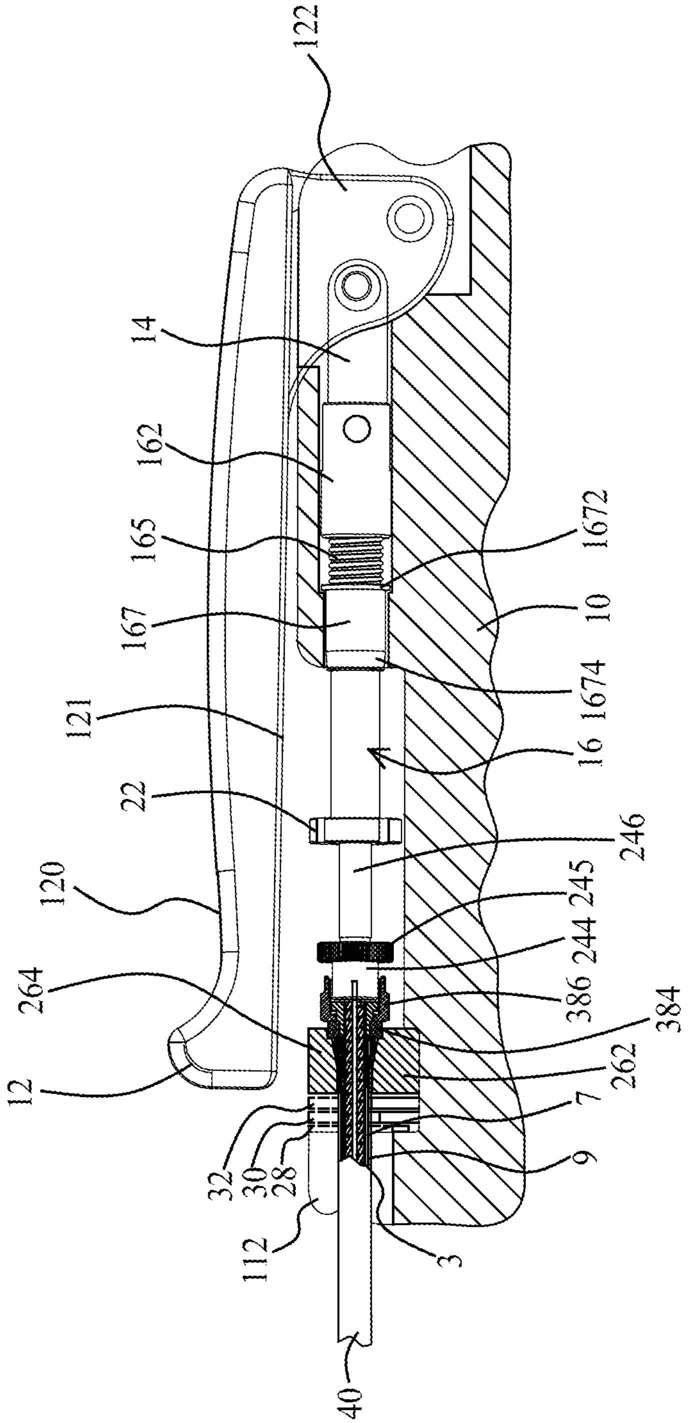
FIG. 3*b* is a cross-sectional view illustrating the adjustable coaxial cable compression tool of FIG. 3*a* in an advanced state according to various embodiments.

FIG. **3*a* is a cross-sectional view illustrating an adjustable coaxial cable compression tool having a coaxial cable end and a coaxial cable connector in a retracted state according to various embodiments. FIG. 3*b* is a cross-sectional view illustrating the adjustable coaxial cable compression tool of FIG. 3*a* in an advanced state according to various embodiments. As shown in FIG. 3*a* and FIG. 3*b*, in an embodiment, a coaxial cable 40 and coaxial cable connector 38 is coaxially aligned within the main body guideway 1124, fixed guideway 28*a*, first guideway 302, second guideway 322, and first and second die cavities 2649, 2628. The coaxial cable 40, as an example, and not to be limiting, comprises an external jacket 9, thin conductive shield 5, braided textile wrap 7, dielectric insulator 3, and a center conductor 1. The coaxial cable connector 38, as an example, and not to be limiting, comprises a drive head nut 386, an outer sleeve 384 and an inner sleeve 382, wherein the drive head nut 386 is sleeved on the inner sleeve 382 and the outer sleeve 384 is coaxially disposed on the inner sleeve 382, and the outer sleeve 384 and inner sleeve 382 form an outer-inner sleeve gap 387 at a cable connecting end thereof. The outer sleeve 384 has a diameter d1**.

In an embodiment, an appropriate sized, shaped and type plunger head end 244, corresponding to the coaxial cable connector 38, is assembled to the plunger 16, wherein the plunger head end 244 is coaxially aligned with the fixed coaxial cable 40 and coaxial cable connector 38, between the plunger 16 and the coaxial cable connector 38. Additionally, an appropriate sized, shaped and type guideway plate is rotatably fit flush with the die support recess 110 and a die fixing screw 119, fixes the body 10 to the second die half 262 of the die block 26 via the die fixing through hole **110*a* and die fixing screw hole 2629*a***.

To begin, an end portion of the braided textile wrap 7 is wrapped back over the external jacket 9, to allow the thin conductive shield 5, dielectric insulator 3, and a center conductor 1 to enter the coaxial cable connector 38, wherein the center conductor 1 coaxially protrudes through to the drive head nut 386. Next, the assembled coaxial cable 40 and coaxial cable connector 38 is coaxially aligned and positioned within the main body guideway 1124, appropriate guideway, and second die cavity 2628. Following, the plunger head connector 22 of the plunger 16 is axially advanced to the drive head nut 386 of the coaxial cable connector 38, wherein the center conductor 1 coaxially protrudes through to the center of the plunger head end 244 as the top surface of the plunger head end 244 abuts an end of the thin conductive shield 5 and dielectric insulator 3. After, the first die half 264 is rotated toward the second die half 262, and the die lever 266 attached to the first die half 264 is snap hooked onto the second die pin 268 of the second die half 262 to secure the assembled coaxial cable 40 in the die block 26. The diameter of a compression end of the first and second die cavities 2649, 2628 is smaller than the diameter of a non-compression end of the first and second die cavities 2649, 2628. The compression end is the end closest to the main body guideway support 112. The first and second die cavities 2649, 2628 comprise a tapered slope 261. Next, the lever arm 12 is rotated toward the body 10, whereby the floating link 14 rotatably attached to the arm offset 122 and plunger 16 is advanced forward toward the main body guideway support 112 via the spring 165, plunger 16, plunger head connector 22 and plunger head 24. The plunger 61 is axially advanced to force the coaxial cable connector 38 onto the coaxial cable end, radially contracting the coaxial cable connector 38 into compression engagement with the coaxial cable end. Specifically, the plunger head 24 pushes the coaxial cable connector 38 against the inner wall of the tapered siding 261 of the first and second die cavities 2649, 2628. During advancement, the cavity grip grooves 2623 hinder the outer sleeve 384 of the coaxial cable 40 to move further into the compressed areas. The compressed spring 165 exerts spring force between the sleeve end flange 1672 of the plunger sleeve end 167 and front sidewall of the bifurcated plunger end 162 of the plunger 16. Accordingly, the outer-inner sleeve gap 387 compresses along with the outer sleeve 384 and the braided textile wrap 7 and the external jacket 9 of the coaxial cable 40 are pressed together. The outer sleeve 384 is compressed from diameter d1 to diameter d2, adjacent to the outer sleeve 384 near the drive head nut 386. The coaxial cable 40 is tightly coupled with the coaxial cable connector 38 and is durable. Next, the lever arm 12 is retracted, allowing the spring force of the spring 165 to move the plunger head 244 and plunger 16 back toward the level arm 12. Lastly, the die lever 266 attached to the first die half 264 is unhooked from the second die pin 268 of the second die half 262, and the first die half 264 is rotated away from the second die half 262 to remove the compressed coaxial cable connector.

In the embodiments, as an example, and not to be limiting, the body 10, lever arm 12, floating link 14, plunger 16, spring 165, plunger pin 167, plunger head connector 22, plunger head 24, die block 26, fixed guideway plate 28, first moveable guideway plate 30, second moveable guideway plate 32, and alternative moveable guideway plates 34, can be made of copper, bismuth, silver, nickel, tin, gold-copper alloy, copper-tin alloy, copper-nickel alloy brass, brass alloy, phosphorous bronze, beryllium-copper, aluminum, aluminum alloy, zinc alloy, steel-bismuth alloy or any combination thereof or combination of other high strength polymer plastics.

Coaxial cables connectors, for example, F-type connectors for RG-6 and RG-6 Quad cables and BNC connectors, are used for CATV, satellite and video applications etc. Generally, twist-on coaxial cable connectors are convenient, but, can be dislodged easily, while compressed coaxial cable connectors are durable. A compression tool can be used to install a coaxial cable connector onto the end of a coaxial cable. However, depending upon the compression tool used, versatility may be non-existent or limited, when compressing coaxial cable connectors of different types, sizes, diameters and lengths. For compression tools with limited versatility and/or a larger size and/or multiple parts and/or multi-step adjustments, operation thereof can be a hindrance. Additionally, versatility, functionability, easability and durability of use is a challenge.

The adjustable coaxial cable compression tool of the embodiments, terminating a coaxial cable connector onto a coaxial cable end, comprising a plunger, a body, a fixed guideway plate, a first moveable guideway plate, a second moveable guideway plate, and a die block, is versatile, functional, easy to use and durable. The plunger comprises a first plunger head and a second plunger head, both having different shapes conforming to different types of coaxial cable connectors and are interchangeable. The body has a body receiving end, wherein the plunger is slidable therein. The fixed, first moveable and second moveable guideway plates have fixed, first and second guideways, each having different diameters, respectively. The die block comprises first and second die halves. The plunger is axially advanced to force the coaxial cable connector onto the coaxial cable end, radially contracting the coaxial cable connector into compression engagement with the coaxial cable end. The adjustable coaxial cable compression tool of the embodiments, via the interchangeable plunger heads, die block, and different sized guideway plates, can be used with coaxial cable connectors of different types, sizes, diameters and lengths, such as F-type BNC, RCA, XLR, DFP, DVI, SCART and RF cable connectors etc. for versatility, functionability, easability and durability.

Unless otherwise indicated, all numbers used herein to express quantities, dimensions, and so forth used should be understood as being modified in all instances by the term "about." The use of the singular includes the plural unless specifically stated otherwise, and use of the terms "and" and "or" means "and/or" unless otherwise indicated.

From the foregoing it will be appreciated that, although specific embodiments have been described herein for purposes of illustration, various modifications can be made without deviating from the spirit and scope of the disclosure. Furthermore, where an alternative is disclosed for a particular embodiment, this alternative can also apply to other embodiments even if not specifically stated.

What is claimed is:

1. An adjustable coaxial cable compression tool, terminating a coaxial cable connector onto a coaxial cable end, comprising:
- a plunger;
- a body having a body receiving end, wherein the plunger is slidable therein; and
- a die block comprising a first die half having a first die flange and a second die half having a second pivot opening and a second die flange, the first and second die halves are complementary and rotatably attached via the first die flange and second die pivot opening and the die block is rotatably attached to a first side of a die support recess of the body via the second die flange, whereby the die block rotatably fits flush with the die support recess;
- a second moveable guideway plate, rotatably attached to the body on a second side of the die support recess of the body, opposite the first side of the die support recess of the body, whereby the second moveable guideway plate rotatably fits flush with the die support recess, and whereby the flush rotations of the second moveable guideway plate and die block are opposite rotational directions, respectively, and
- whereby the plunger is axially advanced to force the coaxial cable connector onto the coaxial cable end and radially contract the coaxial cable connector into compression engagement with the coaxial cable end, both secured within the die block.

2. The adjustable coaxial cable compression tool of claim 1, further comprising a first moveable guideway plate, rotatably attached to the body on the first side of the die support recess of the body, whereby the first moveable guideway plate rotatably fits flush with the die support recess, and whereby the flush rotations of the die block and first moveable guideway plate are the same rotational directions, respectively, and whereby the flush rotations of the second moveable guideway plate and first moveable guideway plate are opposite rotational directions, respectively.

3. An adjustable coaxial cable compression tool, terminating a coaxial cable connector onto a coaxial cable end, comprising:
- a plunger;
- a body having a body receiving end, wherein the plunger is slidable therein;
- a second moveable guideway plate, rotatably attached to the body on a second side of a die support recess of the body, whereby the second moveable guideway plate rotatably fits flush with the die support recess; and
- a die block comprising a first die half having a first die flange and a second die half having a second pivot opening and a second die flange, the first and second die halves are complementary and rotatably attached via the first die flange and second die pivot opening and the die block is rotatably attached to a first side of the die support recess of the body via the second die flange, whereby the die block rotatably fits flush with the die support recess, and wherein the first side and second side are opposite sides of the die support recess, whereby the flush rotations of the second moveable guideway plate and die block are opposite rotational directions, respectively, and whereby the plunger is axially advanced to force the coaxial cable connector onto the coaxial cable end and radially contract the coaxial cable connector into compression engagement with the coaxial cable end, both secured within the die block.

4. The adjustable coaxial cable compression tool of claim 3, further comprising a lever arm pivotably mounted to the body and pivotably attached to the plunger, driving the plunger to axially advance and retract relative to the body, whereby the lever arm rotatably fits parallel with the body.

5. The adjustable coaxial cable compression tool of claim 3, further comprising a first moveable guideway plate, rotatably attached to the body on the first side of the die support recess of the body, whereby the first moveable guideway plate pivotably fits flush with the die support recess, and whereby the flush rotations of the first moveable guideway plate and die block are the same rotational directions, respectively, and whereby the flush rotations of the first moveable guideway plate and second moveable guideway plate are opposite rotational directions, respectively.

6. The adjustable coaxial cable compression tool of claim 3, further comprising a first plunger head having a first plunger head end, a first plunger head rod, and a first plunger head flange therebetween and a second plunger head having a second plunger head end, a second plunger head rod, and a second plunger head flange therebetween, wherein the first plunger head and second plunger head are of different shapes conforming to different types of coaxial cable connectors and are interchangeable.

7. The adjustable coaxial cable compression tool of claim 6, wherein the second plunger head is housed in the body for terminating the coaxial cable connector onto the coaxial cable end.

8. The adjustable coaxial cable compression tool of claim 3, wherein the plunger comprises a plunger sleeve end, a bifurcated plunger end, and a spring therebetween, surrounding the plunger, and wherein the plunger is axially slidable in a body receiving end of the body, providing spring force between the plunger sleeve end and bifurcated plunger end of the plunger.

9. The adjustable coaxial cable compression tool of claim 3, wherein the first die half further comprises a first die cavity and the second die half further comprises a second die cavity complementary to the first die cavity, radially contracting the coaxial cable connector into compression engagement with the coaxial cable end secured within the die block, via the plunger.

10. The adjustable coaxial cable compression tool of claim 3, wherein the die block further comprises a die lever having a first die lever hook on one end thereof, wherein the die lever is rotatably attached within a first die lever opening of the first die half, and wherein the second die half further comprises a second die pin in a second die receiving end, whereby the die lever is snap hooked onto the second die pin when the first die half and second die half are closed.

11. The adjustable coaxial cable compression tool of claim 3, wherein outer rims of non-compression ends of the first and second die cavities comprise cavity grip grooves, respectively, gripping the coaxial cable connector for hindered movement via the plunger.

* * * * *